United States Patent [19]

Mansuripur

[11] Patent Number: 5,200,934
[45] Date of Patent: Apr. 6, 1993

[54] METHOD AND APPARATUS FOR DIRECT OVERWRITE ON MAGNETO-OPTICAL RECORDING MEDIA USING CIRCULARLY POLARIZED MICROWAVES

[75] Inventor: Masud Mansuripur, Tucson, Ariz.

[73] Assignee: Research Corporation Technologies, Inc., Tucson, Ariz.

[21] Appl. No.: 651,565

[22] Filed: Feb. 6, 1991

[51] Int. Cl.$^5$ .............. G11B 11/12; G11B 13/00; G11B 13/04

[52] U.S. Cl. .............................. 369/13; 360/114; 360/59

[58] Field of Search .............. 369/13, 14; 360/59, 360/114, 66, 60; 365/122

[56] References Cited

U.S. PATENT DOCUMENTS

| | | | |
|---|---|---|---|
| 4,264,986 | 4/1981 | Willis | 365/124 |
| 4,424,580 | 11/1984 | Becker et al. | 365/121 |
| 4,466,035 | 8/1984 | Connell et al. | 360/114 |
| 4,561,032 | 12/1985 | Matsumoto et al. | 360/114 |
| 4,796,241 | 11/1989 | Hayakawa et al. | 369/13 |
| 4,855,975 | 8/1989 | Akasaka et al. | 369/13 |
| 4,907,211 | 3/1990 | Horimai et al. | 369/13 |
| 5,020,041 | 5/1991 | Nakao et al. | 360/114 |
| 5,043,960 | 8/1991 | Nakao et al. | 360/59 |

FOREIGN PATENT DOCUMENTS 63-13150 1/1988 Japan.

OTHER PUBLICATIONS

*Applied Solid State Science*, "Magnetic Domain Walls in Bubble Materials", A. P. Malozemoff and J. C. Slonczewski, Academic Press, 1979, pp. 282–289.

*IEEE Transactions on Magnetics*, vol. MAG-10, "Domain Wall Motion Induced by Strong Microwave Fields", Ernst Schlomann and J. Dawson Milne, Sep. 1974, pp. 791–794.

*IEEE Transactions on Magnetics*, "Theory of Domain Wall Motion Induced by Microwave Magnetic Fields", Ernst Schlomann, Jul. 1973, pp. 1051–1056.

"Influence of Spin Precession on the Stability of Bubble Domains", H. Dotsch, 1976, pp. 589–594.

*IEEE Transactions on Magnetics*, vol. MAG-21, "Low Power Microwave Bubble Generator", D. J. Seagle, J. O. Artman and S. H. Charap, 1985, pp. 1785–1787.

*J. Appl. Phys.*, vol. 55, No. 6, "Bubble generation by microwaves: Analytical", D. J. Seagle, S. H. Charap and J. O. Artman, 15 Mar. 1984, pp. 2578–2580.

*J. Appl. Phys.*, vol. 64, No. 7, "Magnetic bubble collapse in the presence of a microwave field", J. L. Dong, J. O. Artman and S. H. Charap, 1 Oct. 1988, pp. 3602–3609.

*J. Appl. Phys.*, vol. 63, No. 9, "The investigation of the process of microwave bubble generation in bubble material", J. L. Dong, J. O. Artman and S. H. Charap, 1 May 1988, pp. 4609–4615.

*IEEE Transactions on Magnetics*, vol. MAG-19, No. 5, "Microwave Generation of Bubble Domains in Magnetic Thin Films", J. O. Artman, S. H. Charap and D. J. Seagle, Sep. 1983, pp. 1814–1816.

*IEEE Transactions on Magnetics*, vol. MAG-12, No. 3, "Highly Sensitive Procedures for Measuring Permeabilities ( ) or Circularly Polarized fields in Microwave Ferrites", Naoyuki Ogasawara, Tadashi Fuse, Tetsuji Inui and Ichiro Saito, May 1976, pp. 256–259.

*Radiation Effects*, vol. 72, "Optical Detection of Electron Spin Resonances Via Magnetic Circular Polarization of F-Center Emission", N. Akiyama, Y. Mori and H. Ohkura, 1983, pp. 277–281.

*Primary Examiner*—Hoa Nguyen
*Attorney, Agent, or Firm*—Dickstein, Shapiro & Morin

[57] ABSTRACT

A method of and system for utilizing circularly polarized microwave radiation in order to provide for the direct overwriting of previously recorded data on a single-layer magneto-optical disk is disclosed in which a microwave source is used to generate a sinusoidal magnetic wave having a fixed magnitude and fixed frequency which is applied to a phase shift switch whose phase is shifted between right circular and left circular polarization states, depending upon each bit of binary data to be recorded. The output from the phase shift switch is fed to a microwave antenna which is utilized to radiate the right circular or left circular polarized microwave signal to a small area of the magnetic film utilized in a magneto-optical disk which is heated by a focused laser beam at the moment during which recording at that location is desired.

26 Claims, 2 Drawing Sheets

METHOD AND APPARATUS FOR DIRECT OVERWRITE ON MAGNETO-OPTICAL RECORDING MEDIA USING CIRCULARLY POLARIZED MICROWAVES

BACKGROUND OF THE INVENTION

The present invention is directed to a method of and apparatus for improving the recording process used with magneto-optical disks. More particularly, the present invention is directed to a method of and apparatus for the direct overwriting on single-layer magneto-optical disks by the use of a circularly polarized microwave magnetic field in combination with a laser beam.

The direct overwriting of recorded data contained on a single-layer magneto-optical disk is highly desirable since it allows recording of data directly onto such a disk without having to first erase the recorded data. While direct overwriting systems are known, they have certain drawbacks. For instance, double layer (or trilayer) exchange-coupled magnetic media are difficult to fabricate, and tradeoffs that need to be made in order to bring these exchange-coupled devices to the proper operational range, are costly in terms of signal-to-noise ratio during readout. Also, direct-overwrite devices based on the technique of magnetic field modulation, require a low-flying magnetic head on the side of the magneto-optical disk opposite to the optical head (i.e., objective lens, laser, beam-splitters, etc.). These low-flying magnetic heads eliminate one of the main advantages of optical recording, known as disk removability; they also restrict the disks to be single-sided.

In magneto-optical recording, the recording system operates by writing information signals on a magneto-optical recording medium, such as a magneto-optical disk, by the application of heat generated by a laser light. Magnetization direction is generally determined by a magnetic field which is applied to the heated portion of the disk upon cooling. One of the advantages of such magneto-optical recording systems over other types of optical disks is that it is possible to rewrite the information signals. In other words, in magneto-optical recording, new data can be written onto a disk in an area of the recording medium in which a recording pattern or data was previously written.

In the prior art, the rewriting of data on a magneto-optical disk has typically been accomplished by inverting the bias magnetic field. Typically, a permanent magnet having more than a predetermined magnetic field intensity is utilized to provide excitation of the magnetic field. In using such a method, the recording and erasing processes are accomplished as two separate steps. For example, the magnet must be mechanically inverted in its position after the first erasure for recording on the appropriate area of the magnetic recording medium from which the previous recording has just been erased. An alternative method, which is used more often, is an electromagnet which can be switched by a current source. No mechanical motion of the magnet is involved. But, because this type of electromagnet is large, it cannot be switched rapidly. Thus it is switched once to erase an entire track, and is then switched a second time to record on the erased track.

It is also known in the prior art to use separate erasing and recording devices in combination in order to effect the overwrite function. In such known methods, erasing and recording are accomplished on different portions of the magneto-optical recording medium. However, it is very difficult to accomplish real-time recording using the two methods described above.

There is also known in the prior art a device for producing a high frequency modulation magnetic field which may be used in magneto-optical recording in order to effect real-time overwriting of previously recorded data. For example, U.S. Pat. No. 4,796,241, to Hayakawa et al., issued Jan. 3, 1989, describes a device for producing a high frequency modulating magnetic field which is especially useful for achieving real-time overwriting in magneto-optical recording. The device produces a magnetic field modulated according to the signal to be recorded on a magneto-optical recording medium in which the signal is recorded in the form of a magnetization direction on the magneto-optical recording medium under irradiation of a laser beam in order to raise the temperature of the medium.

The device disclosed by Hayakawa et al. includes a main magnetic pole formed of a low-loss soft magnetic material having one end facing the magneto-optical recording medium and a sheath conductor wound around the main magnetic pole which consists of a parallel connection of a plurality of insulated elementary wires.

Another example of a device which provides for the direct overwriting of data previously recorded on a magneto-optical recording medium is shown in U.S. Pat. No. 4,907,211 issued Mar. 6, 1990, to Horimai et al. In the device of Horimai et al., the magneto-optical recording medium is irradiated with a laser light corresponding to an information signal only when a magnetic field sufficient to invert the magnetizing direction of the magneto-optical recording medium is applied. The device of Horimai et al. prevents a high-noise region from being formed such that a high density recording can be accomplished.

An example of a non-direct overwriting system is shown in U.S. Pat. No. 4,855,975 to Akasaka et al., issued Aug. 8, 1989. That patent discloses a magneto-optical recording method for recording data on a recording layer of a multi-layered magnetic recording medium having a first layer having a perpendicular magnetic anisotropy which acts as a recording layer and a second layer having a perpendicular magnetic anisotropy which acts as a reference layer. However, the device of Akasaka et al. utilizes two adjacent laser beams, in addition to the magnetic field producing device. Thus, it is far more complex than either of the two devices described above, or that of the present invention.

The present invention, on the other hand, provides for the direct overwriting on single-layer magneto-optical disks by the use of a circularly polarized microwave field in combination with a laser beam in order to reverse the magnetization of a small region heated by the laser beam. Such a system has several advantages over the known techniques discussed above. For example, the microwave magnetic field utilized to achieve the magnetization reversal of the magneto-optical disk does not have to be sharply focused.

Another advantage of the present invention is that the magnetization of the heated region can be turned to a desired direction by applying the microwave magnetic field of the proper sense of polarization and amplitude, regardless of the initial direction of the magnetization of the heated region, i.e., regardless of the initial direction of the already recorded data which is being overwritten. This feature allows the overwriting of data to be accomplished without having to first read the recorded data. The magneto-optical overwriting system of the present invention allows the direct overwriting of previously recorded data on a single layer magneto-optical disk using a circularly polarized microwave magnetic field that applies to perpendicular magneto-optical media.

The present invention relies on its ability to switch the direction of magnetization in a perpendicular magnetic thin film (such as that used with magneto-optical disks) using an in-plane oscillating magnetic field. The frequency of oscillations are generally in the neighborhood of the ferromagnetic resonance frequency of the thin film material.

While it is known to utilize linearly polarized microwave fields with, for example, bubble domain memories, such as that disclosed by D. J. Seagle, J. O. Artman and S. H. Charap, Bubble Generation by Microwaves: Analytical, J. Appl. Phys. 55 (6), Mar. 15, 1984, pp. 2578-2580 and J. O. Artman, S. H. Charap and D. J. Seagle, Microwave Generation of Bubble Domains and Magnetic Thin Films, IEEE Transactions on Magnetics, Vol. Mag.-19, No. 5, September 1983, pp. 1814-1816. Neither of those two articles, however, disclose nor suggest, the use of circularly polarized microwaves for use with magneto-optical disks.

It has also been proposed to use circularly polarized optical radiation in order to change the optical transmission characteristics of polarized light through a ferromagnetic thin film such as that used for magnetic bubble devices. Such a method and apparatus is disclosed in U.S. Pat. No. 4,424,580 to Becker et al., issued Jan. 3, 1984. Becker et al. discloses such methods and apparatus for reversibly altering the magnetic characteristics or domains of ferromagnetic material by photomagnetic means, particularly by electron spin reversal.

In the reported experiments by Messrs. Seagle, Charap and Artman, as well as others, the wave radiation is delivered to a small area of the magnetic film in order to generate reverse-magnetized domains. However, all of such methods and systems cannot tell the initial state of the magnetization. That is, since the microwave radiation utilized is linearly polarized, the magnetization state of the recorded data could be either "UP" or "DOWN". However, the present invention, by utilizing circularly polarized microwave fields, can utilize the right sense of polarization to switch from the "UP" to the "DOWN" state and the left sense of polarization to switch from the "DOWN" to the "UP" magnetization state in a unique and definite manner.

Thus, the present invention, by replacing the electromagnet of a conventional thermomagnetic recording system with a microwave source that delivers a fixed frequency AC in-plane magnetic field to a small region of the disk is able to overwrite the initial state of magnetization of the magneto-optical disk.

An advantage of the present invention is that the microwave field does not have to be sharply focused, since the recorded domains are not defined by the area exposed to the microwave field itself. The recorded domain is determined by the size of the focused laser beam, as is conventional in thermomagnetic recording. Further, there is no need to fine-tune the frequency of the microwave field, since the temperature variations induced at each location on the disk as the laser beam passes over that location will vary the effective internal field on the dipoles and thereby change the resonance frequency.

SUMMARY AND OBJECTS OF THE INVENTION

In view of the foregoing, it should be apparent that there still exists a need in the art for a method of and apparatus for providing for the direct overwrite of previously recorded data on single layered magneto-optical disks which can be readily accomplished in an efficient manner using light waves and compact recording systems.

More particularly, it is an object of the present invention to provide for a method of and apparatus for the direct overwriting of data on a magneto-optical disk which is independent of the existing or initial magnetic state of the data on the disk.

It is a further object of the present invention to provide for a method of and apparatus for the direct overwriting of data on a magneto-optical disk which utilizes circularly polarized magnetic waves in the microwave range of the electromagnetic radiation and which requires no fine-tuning of the frequency of the magnetic field utilized.

Still another object of the present invention is to provide for a method of and apparatus for the direct overwriting of data on a single-layer magneto-optical disk in which the microwave source utilized to accomplish the recording of data on the disk does not have to be sharply focused.

Briefly described, these and other objects of the present invention are accomplished in accordance with its method aspects by replacing the electromagnet of conventional single-layer magneto-optical disk systems with a microwave source having a fixed frequency. The range of the frequency is different for each type of different film utilized on a magneto-optical disk. In the case of TbFeCo films, the frequency is in the range of 10 GHz to 50 GHz. The microwave field is circularly polarized and is delivered to the general area illuminated by the laser beam utilized with such conventional magneto-optical recording systems.

The laser beam utilized with conventional magneto-optical recording systems is operated in the continuous wave or CW mode. As the laser beam moves over the disk, the temperature on the disk will rise and fall, following the same profile and time-dependence at every location on the disk. In a narrow range of temperature, the material has a resonance frequency which is exactly that applied by the external source of microwaves. At the time when that particular temperature is reached, the microwave energy excites the region of the material which has the appropriate temperature. The magnetic state of that area will be reversed only when the sense of polarization of the magnetic field is correct.

The stream of data, consisting of 0's and 1's that is to be recorded, is used to control the sense of polarization of the magnetic field. For example, when a "1" is to be written, the polarization must be right circular. If the magnetization state is "UP", it will turn "DOWN" in the area of overlap between the laser beam and the microwave field. However, if the magnetization is already "DOWN" in that area, nothing will happen.

Similarly, in order to write a "0", the polarization of the microwave field is switched to a left circular polarization. Under such circumstances, if the overlap region is "DOWN" magnetized, it will turn "UP". However, if the magnetic state of the overlap region is already "UP", it will remain that way.

In its apparatus aspects, the present invention utilizes a microwave source which is connected through a phase shift switch to a microwave antenna. The binary data stream is utilized to switch the phase shift switch between its right circular polarization and left circular polarization positions. The top surface of the substrate of the magneto-optical disk is utilized to form a cavity with the microwave antenna in order to provide an efficient coupling of the microwave radiation between the antenna and the magneto-optical disk.

DETAILED DESCRIPTION OF THE PREFERRED EMBODIMENT

Figure 1:
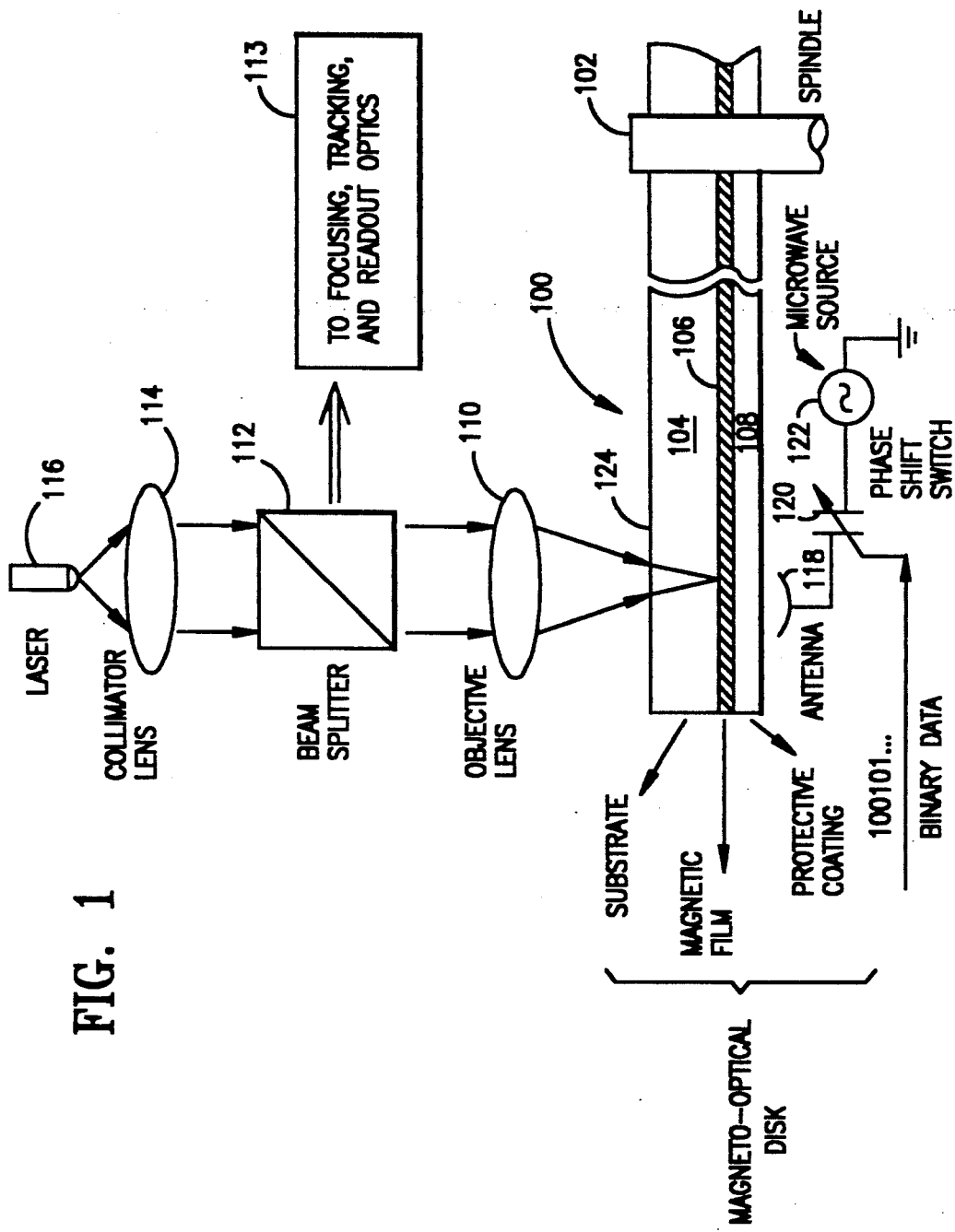
FIG. 1 is a schematic drawing of the apparatus of the present invention showing the instant direct-overwrite system used in conjunction with a conventional single-layer magneto-optical disk system.
Figure 2:
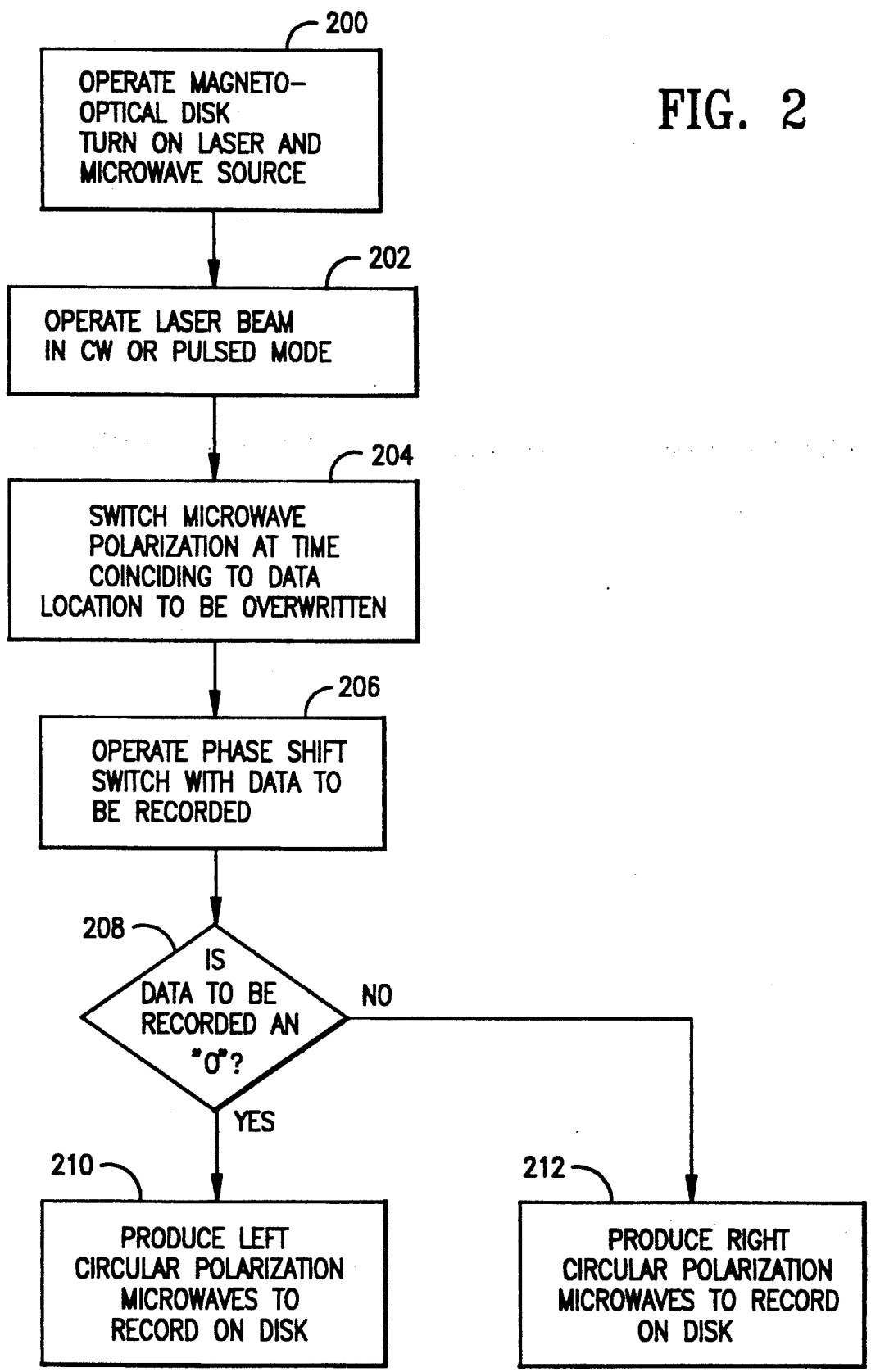
FIG. 2 is a block diagram showing the steps of the method of the present invention.

Referring now to the drawings wherein like reference numerals are used with the same elements throughout, there is shown in FIG. 1 the direct overwrite system of the present invention. As discussed above, the present invention is designed to be utilized with a conventional singlelayer magneto-optical disk 100 which is mounted for rotation at a constant speed of approximately 3000–7000 revolutions per minute. The magneto-optical disk 100 typically consists of a transparent substrate 104, usually formed from glass or plastic, which is coated with a thin film of magnetic material 106. The thin film of magnetic material may be an amorphous film of rare earth- transition metal alloys, such as TbFeCo, GdTbFeCo, GdFe, GdTb, or GdCo. The thin film of magnetic material 106 is usually protected by a protective coating layer 108.

As is known to those of ordinary skill in the art, the thin magnetic film layer 106 is the essential part of the magneto-optical disk 100, that is, the data is recorded on the thin magnetic film 106. Typically, the thickness of the magnetic film 106 is a few hundred angstroms. Each bit of information, that is, a binary 0 or a binary 1, is recorded on the magnetic film in an area whose size is determined by the size of the focused laser beam. A typical size for a focused laser beam is approximately one micrometer$^2$.

As is also known to those of ordinary skill in the art, the temperature reached in the area heated by the laser beam is critical within a certain range of temperatures of between 130° C. and 150° C., which is the range within which the recording takes place. The areas of the thin magnetic film 106 which do not reach such temperatures are not affected at all during the recording process.

When a bit is recorded, the magnetization of the thin film material in the small area corresponding to that bit is either of two states: "UP", that is, pointing towards the objective lens 110 as shown in FIG. 1, which may represent a recorded "1"; or "DOWN", that is, pointing away from the objective lens 110 as shown in FIG. 1, which may represent a recorded "0". As described above, whether a "1" or a "0" is recorded in a particular spot depends upon the sense of polarization of the microwaves emanating from the microwave antenna 118 at the time the spot was heated up by the laser 116.

Conventional magneto-optical disks utilize several optical components during their operation. The first such component utilized is a laser 116 which is typically a semiconductor GaAlAs laser diode. Such a laser diode, when utilized with the present invention, requires only about 20–30 milliwatts of continuous (CW) power. However, the laser 116 may operate in either the CW mode in which the laser is always lasing or in the pulsed mode. When operated in the latter mode, the pulses should be synchronized with the stream of binary data which is fed to the phase shift switch 120, as will be described later herein.

The laser beam from the laser 116 impinges upon a collimator lens 114 which collects the diverging beam of the laser diode and produces a collimated beam which is highly coherent and free from aberrations. Such collimating lenses typically have a numerical aperture of about 0.3–0.4.

The collimated beam exiting from the collimator lens 114 is then impinged on a beam splitter 112. The beam splitter 112 may be either of a regular or polarizing type and plays no specific role during the recording process described herein. The beam splitter 112 is utilized to divert a fraction of the returning beam, that is, the beam reflected from the disk towards the focusing, tracking and readout optics 113 typically utilized with conventional magneto-optical disk systems. Such elements extract the readout information as well as the supplemental information for the control of focusing and tracking servo systems, in a known manner.

The beam exiting the beam splitter 112 impinges upon an objective lens 110 which focuses the laser beam onto the surface in the region of the thin magnetic film 106. The area of the bright spot produced by the laser 116 on the thin magnetic film 106 is typically one square micrometer. The power of the beam impinging on the magnetic film is such that the magnetic film 106 of the disk 100 in the illuminated area reaches a temperature of about 200°–300° C. while exposed to the beam. As will be understood by those of ordinary skill in the art, since the disk is rotating at a typical speed of several thousand revolutions per minute, the duration of exposure of any given spot on the magnetic film is of the order of about several tens of nanoseconds.

It will also be known to those of ordinary skill in the art that the exposure time of any given spot on the thin magnetic film 106 is dependent upon the rotational speed of the disk, the radius of the disk at the spot being illuminated and the size of the focused spot. A typical numerical aperture (NA) for the objective lens is about 0.5–0.8. It will be known to those of ordinary skill in the art that the objective lens 110 must be corrected for aberrations and should deliver a diffraction limited spot at the focal plane of the magneto-optical disk 100.

The microwave antenna 118 which is fed by the microwave source 122 is located on the opposite side of the magneto-optical disk 100 than that of the laser 116 and associated objects 110, 112 and 114. The microwave antenna can be located on the other side of the disk, but at a loss of energy and efficiency. The microwave source 122 is used to generate a sinusoidal waveform of a fixed magnitude and fixed frequency. The microwave frequency, which typically ranges from 20–50 GHz, should correspond to the frequency at which the heated thin film magnetic material 106 absorbs the microwave energy and exhibits ferromagnetic resonance.

The ferromagnetic resonance under such conditions is very different from the ferromagnetic resonance (FMR) frequency of the thin film magnetic material 106 at room temperature. For example, amorphous TbFeCo films should have a room temperature FMR frequency of several hundred gigahertz. But, when such films are heated to a temperature close the Curie point of around 200° C., their FMR frequency drops to about 10 GHz. Since the information to be recorded is only recorded in a selected range of temperatures just below the Curie point, the required frequency of the microwave source will be approximately 20–50 GHz at most.

The microwave radiation output from the microwave source 122 is fed to a phase shift switch 120. The phase shift switch 120 is capable of changing the state of polarization of the microwave signal fed to it from the microwave source 122 between two states: the right circular polarization (RCP) and a left circular polarization (LCP). Since only phase switching of the microwave signal is utilized by the present invention, the flow of microwave power remains uninterrupted. Since the present invention does not utilize power switching, the switching is fast and can be effected within a few periods of the microwave frequency, or within subnanosecond switching times.

The data that is to be recorded on the disk 100 is used to determine the state of the phase shift switch 120. For example, when a binary "0" is to be recorded, the switch 120 is set to generate RCP microwave signals. On the other hand, when a binary "1" is to be recorded, the phase shift switch 120 is used to generate LCP microwave signals. Those two states are the only states of polarization that are required for the microwave signal in order for the present invention to operate.

The microwave antenna 118 receives the RCP or LCP microwave signals from the phase shift switch 120 and delivers those signals to the magneto-optic film 106 contained within the magneto-optical disk 100. As discussed above, the microwave signals do not need to be focused on the recording spot. The microwave signals radiated by the microwave antenna 118 can be spread out through a large volume of the magneto-optical disk 100. Thus, the microwave antenna 118 does not have to be specifically designed for directing the microwave signal to the proper spot on the disk 100. As long as the spot heated by the laser 116 receives some of the microwave signals from the microwave antenna 118, the recording described herein is accomplished.

The overall efficiency of the system of the present invention, however, depends upon how much the microwave antenna 118 can confine the microwave energy to the area of the magnetic film 106 where it is needed. Thus, it is desirable to concentrate the microwaves radiated by the microwave antenna 118 between the microwave antenna 118 and the top surface 124 of the substrate 104 of the magneto-optical disk 100. Thus, the substrate 104 should form a cavity with the microwave antenna 118 to prevent the loss of energy by radiation. Since the confinement of the microwaves radiated by the microwave antenna 118 to the region between the microwave antenna 118 and the top surface 124 of the substrate 104 of the disk 100 provides for the efficient coupling of the microwave signal, only a few microwatts of energy need be produced by the microwave source 122 for the proper operation of the recording process utilized by the present invention.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A method for direct overwriting of data on a rotating magneto-optical disk, comprising the steps of: providing said rotating magnetooptical disk;
    operating a laser beam to impinge on a desired area of the magneto-optical disk on which data is to be directly overwritten;
    activating a source of polarized microwave radiation at a predetermined time such that said source of polarized microwave radiation irradiates the desired area at the same time as said laser beam impinges on said desired area of said magneto-optical disk on which data is to be directly overwritten; and
    using the data to be written to control the polarization of said microwave radiation irradiated by said microwave source such that the data is directly overwritten existing data on the magneto-optical disk.

2. The method of claim 1, wherein said microwave radiation is of a left circular or a right circular polarized state.

3. The method of claim 1, wherein said polarization changes between left and right circular polarized states in accordance with a binary state change of said data to be written.

4. The method of claim 3, wherein the state of polarization of the data to be overwritten changes only if the binary state of the data to be written is different than that of said data to be overwritten.

5. The method of claim 1, wherein said laser beam is operated in a continuous mode.

6. The method of claim 1, wherein said magneto-optical disk comprises a single layer magnetooptical disk.

7. The method of claim 1, wherein said source of polarized microwave radiation generates a sinusoidal waveform having a fixed magnitude and a fixed frequency.

8. The method of claim 1, wherein said laser beam is operated in a pulsed mode.

9. Apparatus for direct binary overwriting of data on a magneto-optical disk, comprising:
    said magneto-optical disk
    a laser for generating a light beam for impingement on an area of said magneto-optical disk wherein said area is desired for data to be overwritten thereon;
    a source of polarized microwave radiation located in such proximity to said magneto-optical disk that the microwave radiation which impinges on said area of said magneto-optical disk in accordance with binary data to be recorded; and
    a phase shift switch connected to said source of polarized microwave radiation such that the state of said polarized microwave radiation can be changed by said data to be recorded.

10. The apparatus of claim 9, wherein said source of polarized microwave radiation comprises an antenna which is located adjacent to said magneto-optical disk such that said antenna and said magneto-optical disk form a cavity to enable efficient coupling of said source of microwave radiation with said magneto-optical disk.

11. The apparatus of claim 9, wherein said source of polarized microwave radiation generates left and right circular polarized states of microwave radiation.

12. The apparatus of claim 9, wherein said data to be recorded is applied to said phase shift switch in order to change the state of said polarized microwave radiation used to overwrite data in accordance with a binary state change of said data to be recorded.

13. The apparatus of claim 12, wherein the state of polarization of the data to be overwritten changes only if the binary state of the data to be recorded is different than that of said data to be overwritten.

14. The apparatus of claim 9, wherein said laser beam is generated in a continuous mode.

15. The apparatus of claim 9, wherein said magneto-optical disk comprises a single layer magneto-optical disk.

16. The apparatus of claim 9, wherein said source of polarized microwaves generates a sinusoidal waveform having a fixed magnitude and a fixed frequency.

17. The apparatus of claim 9, wherein said laser beam is generated in a pulsed mode.

18. A magneto-optical disk drive system comprising a rotating magneto-optical disk and a laser beam system for heating predetermined selected areas on said magneto-optical disk for recording data on said magneto-optical disk and an apparatus for accomplishing direct overwriting of data on said magneto-optical disk, said apparatus comprising:

a source of polarized microwave radiation located in such proximity to said magneto-optical disk that the microwave radiation irradiated by said source of polarized microwave radiation impinges on said area of said magneto-optical disk wherein said area contains existing data and is desired to be overwritten with new data to be recorded; and a phase shift switch connected to said source of polarized microwave radiation such that the state of said polarized microwave radiation can be changed by said data to be recorded.

19. The apparatus of claim 18, wherein said source of polarized microwave radiation comprises an antenna which is located adjacent to said magneto-optical disk such that said antenna and said magneto-optical disk form a cavity to enable efficient coupling of said source of microwave radiation with said magneto-optical disk.

20. The apparatus of claim 18, wherein said source of polarized microwave radiation generates left and right circular polarized states of microwave radiation.

21. The apparatus of claim 18, wherein said data to be recorded is applied to said phase shift switch in order to change the state of said polarized microwave radiation used to overwrite data in accordance with a binary state change of said data to be recorded.

22. The apparatus of claim 21, wherein the state of polarization of the data to be overwritten changes only if the binary state of the data to be recorded is different than that of said data to be overwritten.

23. The apparatus of claim 18, wherein said laser beam is generated in a continuous mode.

24. The apparatus of claim 18, wherein said magneto-optical disk comprises a single layer magneto-optical disk.

25. The apparatus of claim 18, wherein said source of polarized microwaves generates a sinusoidal waveform having a fixed magnitude and a fixed frequency.

26. The apparatus of claim 18, wherein said laser beam is generated in a pulsed mode.

* * * * *